United States Patent [19]

Brandt

[11] Patent Number: 4,562,334
[45] Date of Patent: Dec. 31, 1985

[54] GAS SHIELDING APPARATUS

[75] Inventor: Daniel Brandt, Los Alamos, N. Mex.

[73] Assignee: The United States of America as represented by the United States Department of Energy, Washington, D.C.

[21] Appl. No.: 617,652

[22] Filed: Jun. 5, 1984

[51] Int. Cl.⁴ .............................................. B23K 9/16
[52] U.S. Cl. ...................................... 219/74; 219/136
[58] Field of Search ................. 219/72, 74, 75, 136, 219/61.1

[56] References Cited

U.S. PATENT DOCUMENTS

| | | | |
|---|---|---|---|
| 2,866,074 | 12/1958 | Ronay | 219/74 |
| 2,918,563 | 12/1959 | Ternisien et al. | 219/74 |
| 2,977,457 | 3/1961 | Houldcroft | 219/74 |
| 3,125,666 | 3/1964 | Gorman | 219/74 |
| 3,450,857 | 6/1969 | Webb | 219/74 |
| 3,469,304 | 9/1969 | Medsker | 29/474 |
| 3,875,364 | 4/1975 | Boyett | 219/74 |
| 4,495,401 | 1/1985 | Sidorov et al. | 219/136 |
| 4,500,764 | 2/1985 | Girodi et al. | 219/61.1 X |

FOREIGN PATENT DOCUMENTS

| | | | |
|---|---|---|---|
| 1046632 | 12/1932 | Australia | 219/72 |
| 585003 | 1/1978 | U.S.S.R. | 219/74 |

Primary Examiner—C. L. Albritton
Assistant Examiner—C. M. Sigda
Attorney, Agent, or Firm—Lee W. Huffman; Paul D. Gaetjens; Judson R. Hightower

[57] ABSTRACT

An apparatus for preventing oxidation by uniformly distributing inert shielding gas over the weld area of workpieces such as pipes being welded together. The apparatus comprises a chamber and a gas introduction element. The chamber has an annular top wall, an annular bottom wall, an inner side wall and an outer side wall connecting the top and bottom walls. One side wall is a screen and the other has a portion defining an orifice. The gas introduction element has a portion which encloses the orifice and can be one or more pipes. The gas introduction element is in fluid communication with the chamber and introduces inert shielding gas into the chamber. The inert gas leaves the chamber through the screen side wall and is dispersed evenly over the weld area.

7 Claims, 3 Drawing Figures

GAS SHIELDING APPARATUS

This invention is the result of a contract with the Department of Energy (Contract No. W-7405-ENG-36).

BACKGROUND OF THE INVENTION

The invention described herein relates generally to gas shielding of heated areas and more particularly to structures for preventing oxidation by uniformly distributing inert shielding gas over the weld area of workpieces being welded together.

A significant problem in welding is that the weld material and the workpieces can oxidize in air when they are heated. If the weld oxidizes, it will be porous and weak. It is well known that welding in an atmosphere devoid of oxygen will prevent oxidation. Workpieces such as pipes have been welded together in an atmosphere of inert gas. The air within a sealed chamber is replaced with an inert gas and welding is performed inside the chamber. Using such a chamber is expensive, time-consuming and requires a large supply of inert gas.

To avoid these disadvantages, other devices for surrounding the weld area with an inert gas have been developed. These include a gas flooding device for attachment to a welding tool, disclosed in U.S. Pat. No. 3,875,364 to Boyett, and a flexible conduit with a porous wall through which inert gas is distributed, disclosed in U.S. Pat. No. 3,450,857 to Webb. Both of these devices provide an atmosphere of inert gas around a portion of the weld area during welding and for a limited period of time thereafter while the weld area cools. Neither device provides a uniform atmosphere of inert gas around the entire weld area of the workpieces throughout the welding operation. Consequently, the speed with which welding can be performed with these devices is limited by the cooling rate of the weld area and the extent to which the weld area is covered by inert gas. It is therefore desirable to cover the entire weld area with an uniform atmosphere of inert gas throughout the welding operation.

SUMMARY OF THE INVENTION

One object of the present invention is to provide an improved inert gas shielding apparatus.

Another object of the invention is to provide an inert gas shielding apparatus that uniformly distributes inert gas over the entire weld area of the workpieces.

Still another object of the invention is to provide an apparatus that requires little shielding gas.

Another object of the invention is to provide an apparatus that cools the weld area rapidly.

To achieve the foregoing and other objects, and in accordance with the purposes of the present invention, as embodied and broadly described herein, there is provided an apparatus for preventing oxidation by uniformly distributing inert shielding gas over the weld area of workpieces being welded together. The apparatus comprises a chamber and gas introduction means for introducing inert gas into the chamber. The chamber has an annular top wall with inside and outside edges, an annular bottom wall with inside and outside edges, an inner side wall and an outer side wall both of which connect the top and bottom walls. One of the side walls is a screen and the other side wall has a portion defining an orifice. The gas introduction means is in fluid communication with the chamber and has a portion enclosing the orifice. The gas introduction means can be one pipe and the screen side wall can be at least two layers of screen. The gas introduction means can be a plurality of pipes. The screen side wall includes a multiplicity of openings that can have a total area smaller than the area of fluid communication between the gas introduction means and the chamber. Preferably the outer side wall comprises a screen, the inner side wall has a portion defining an orifice and a centering element for slidably moving the apparatus within the workpieces is disposed on the top or bottom wall.

One advantage of the present invention is that inert shielding gas can be uniformly distributed over the entire weld area of the workpieces.

Another advantage of the invention is that it distributes inert shielding gas evenly and with little turbulence.

Still another advantage of the invention is that it can be used on either or both the weld side or the back side of the weld joint.

Another advantage of the invention is that it is inexpensive to manufacture.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
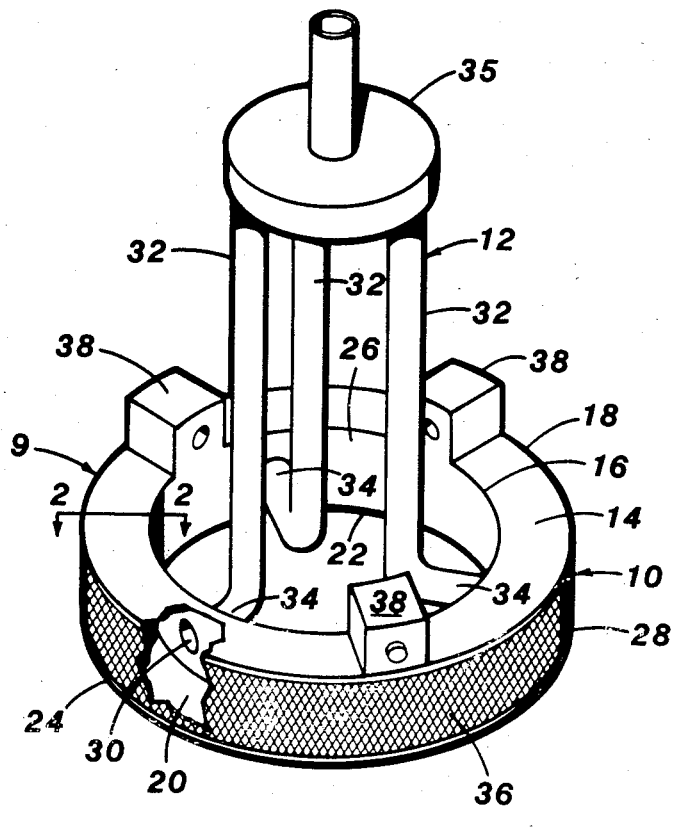
FIG. 1 shows a partial fragmentary perspective view of the preferred embodiment of the invention.

Reference is now made to FIG. 1, which shows a partial fragmentary perspective view of the preferred embodiment of the present invention. The present invention is an apparatus 9 for preventing oxidation by uniformly distributing inert shielding gas over the weld area of workpieces such as pipes being welded together. The apparatus 9 comprises a chamber 10 and gas introduction means 12. The chamber 10 has an annular top wall 14 with an inside edge 16 and an outside edge 18. Chamber 10 includes an annular bottom wall 20 with an inside edge 22 and an outside edge 24. An inner side wall 26 is disposed between and connects inside edge 16 of top wall 14 with inside edge 22 of bottom wall 20. An outer side wall 28 is disposed between and connects outside edge 18 of top wall 14 with outside edge 24 of bottom wall 20. Outer side wall 28 comprises a screen. Inner side wall 26 has a portion defining an orifice 30.

Figure 2:
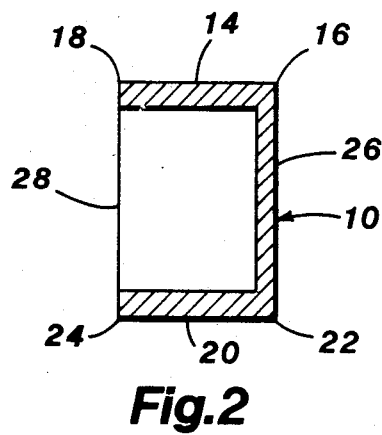
FIG. 2 shows a side view in cross-section of a segment of the embodiment illustrated in FIG. 1, taken along section line 2—2 of FIG. 1.

FIG. 2 shows a side view in cross-section of the chamber 10 of the preferred embodiment illustrated in FIG. 1, taken along section line 2—2 of FIG. 1. The chamber 10 has a top wall 14 with an inside edge 16 and an outside edge 18. The chamber 10 includes a bottom wall 20 with an inside edge 22 and an outside edge 24. Inner side wall 26 and outer side wall 28 connect top wall 14 to bottom wall 20.

Referring again to FIG. 1, gas introduction means 12 preferably includes three pipes 32. Each pipe 32 is in fluid communication with chamber 10. Each pipe 32 has a portion 34 which encloses an orifice 30, only one of which is shown. Gas introduction means 12 can include a manifold 35 for directing inert gas from a source of gas (not shown) to the pipes 32. Inert shielding gas such as Argon or Helium is introduced into chamber 10, leaves chamber 10 through outer side wall 28 and is dispersed evenly over the weld area of the workpieces being welded together. Outer side wall 28 can be two or more layers of screen. When gas introduction means 12 includes only one pipe 32, outer side wall 28 can have two layers of screen if the diameter of chamber 10 is small (eg. 10 cm) but if it is large (eg. 3 meters) then it should include at least three layers of screen to ensure even distribution of the inert gas. Preferably the screen material used is about 100 mesh. Outer side wall 28 is a screen which includes a multiplicity of apertures 36. Preferably the total area of apertures 36 is smaller than the area of fluid communication between gas introduction means 12 and chamber 10, so that the pressure within chamber 10 is greater than the pressure around the weld area of the workpieces. This pressure differential will ensure that the inert shielding gas is uniformly distributed around the weld area.

The preferred embodiment of the invention shown in FIG. 1 is designed to be placed inside of workpieces such as pipes (not shown) being welded together. Welding is performed on the outside of the pipes and the preferred embodiment of the invention shields the back side of the weld joint from inside the pipes. This embodiment of the invention can include centering elements 38 which permit slidable movement of apparatus 9 within the pipes. Centering elements 38 can be disposed on top wall 14, as shown, or on bottom wall 20.

Figure 3:
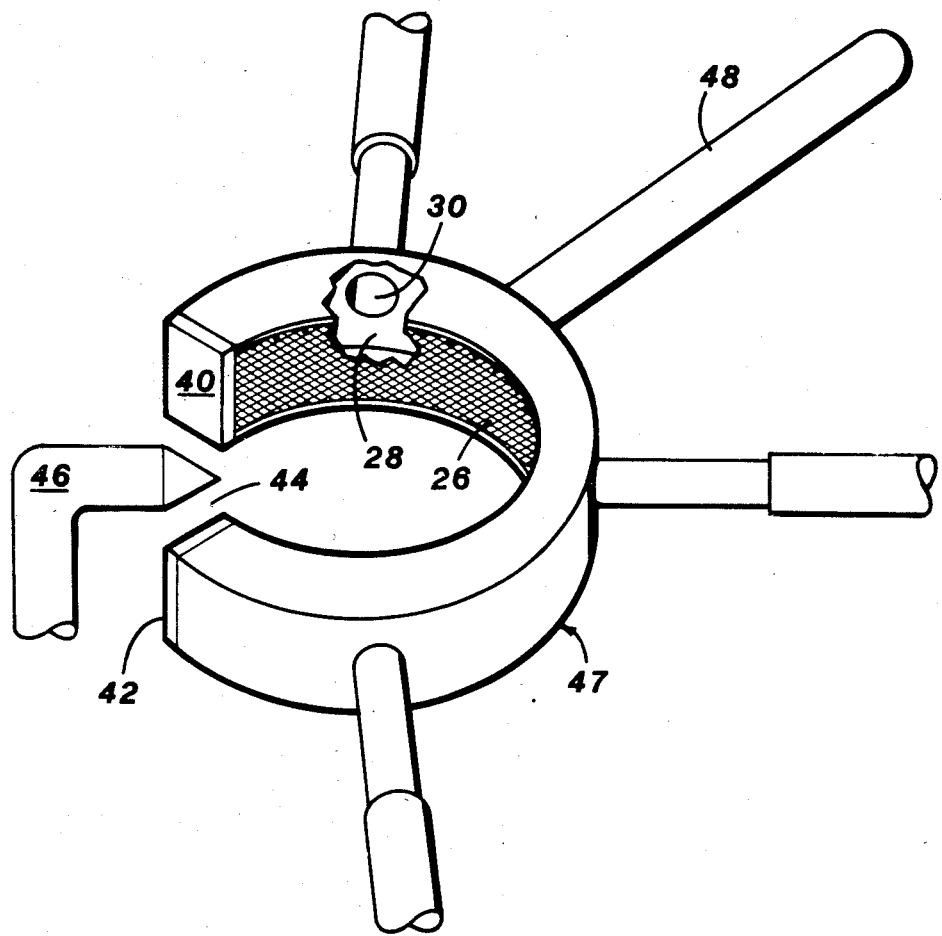
FIG. 3 shows a partial fragmentary perspective view of another embodiment of the invention.

FIG. 3 shows another embodiment of the invention. The differences between the FIG. 3 embodiment and that of FIG. 1 are that in FIG. 3 inner side wall 26 is a screen, outer side wall 28 has a portion defining an orifice 30 and chamber 10 includes a first end portion 40 and a second end portion 42 which define an opening 44. Opening 44 provides access for a torch 46 to the workpieces (not shown) which are welded together. This apparatus 47 can include a support handle 48 for holding the apparatus 47 at a desired position to distribute inert gas over the weld area. This embodiment of the invention is designed to provide inert shielding gas to the outside surfaces, ie. the weld side, of pipes being welded together. It can be used in conjunction with the preferred embodiment of the invention shown in FIG. 1 to simultaneously shield the weld side and the back side of the weld joint.

The foregoing description of several embodiments of the invention has been presented for purposes of illustration and description. It is not intended to be exhaustive or to limit the invention to the precise forms disclosed. They were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for preventing oxidation by uniformly distributing inert shielding gas over a weld area of workpieces being welded together, said apparatus comprising:
   a. a chamber, said chamber having an annular top wall with inside and outside edges, an annular bottom wall with inside and outside edges, an inner side wall disposed between and connecting said inside edges of said top and bottom walls and an outer side wall disposed between and connecting said outside edges of said top and bottom walls, said outer side wall comprising a screen, said inner side wall having a portion defining an orifice; and
   b. gas introduction means for introducing inert gas into said chamber, said gas introduction means being in fluid communication with said chamber and having a portion which encloses said orifice, so that gas introduced into said chamber leaves said chamber through said outer side wall and is dispersed evenly over the weld area of the workpieces being welded together.

2. The invention of claim 1, wherein said gas introduction means comprises one pipe and said screen side wall comprises at least two layers of screen.

3. The invention of claim 1, wherein said gas introduction means comprises a plurality of pipes.

4. The invention of claim 3, wherein said screen side wall comprises at least two layers of screen.

5. The invention of claim 1, wherein said screen side wall includes a multiplicity of apertures having a total area smaller than the area of fluid communication between said gas introduction means and said chamber, so that the pressure within said chamber is greater than the pressure around the weld area.

6. The invention of claim 1, further comprising centering means for slidably moving said apparatus within the workpieces, said centering means being disposed on said top wall.

7. The invention of claim 1, further comprising centering means for slidably moving said apparatus within the workpieces, said centering means being disposed on said bottom wall.

* * * * *